US010029610B1

(12) United States Patent
Salter et al.

(10) Patent No.: US 10,029,610 B1
(45) Date of Patent: Jul. 24, 2018

(54) LIGHTING SYSTEM AND INDICATING METHOD FOR A VEHICLE

(71) Applicant: Ford Global Technologies, LLC, Dearborn, MI (US)

(72) Inventors: Stuart C. Salter, White Lake, MI (US); Paul Kenneth Dellock, Northville, MI (US); Mehran Niksimaee, Orchard Lake Village, MI (US); Stephen Kenneth Helwig, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/604,014

(22) Filed: May 24, 2017

(51) Int. Cl.
| | | |
|---|---|---|
| *B60Q 1/26* | (2006.01) | |
| *B60Q 1/44* | (2006.01) | |
| *B60Q 1/50* | (2006.01) | |
| *B60Q 1/24* | (2006.01) | |
| *F21S 8/10* | (2006.01) | |
| *H02J 7/00* | (2006.01) | |
| *F21S 43/20* | (2018.01) | |
| *F21S 43/14* | (2018.01) | |

(Continued)

(52) U.S. Cl.
CPC ............. *B60Q 1/26* (2013.01); *B60Q 1/24* (2013.01); *B60Q 1/2696* (2013.01); *B60Q 1/44* (2013.01); *B60Q 1/50* (2013.01); *F21S 43/14* (2018.01); *F21S 43/255* (2018.01); *F21S 48/215* (2013.01); *F21S 48/2218* (2013.01); *H02J 7/0047* (2013.01); *B60Q 2400/20* (2013.01); *F21Y 2113/13* (2016.08); *F21Y 2115/10* (2016.08); *H02J 2007/005* (2013.01)

(58) Field of Classification Search
CPC . B60Q 1/44; B60Q 1/52; B60Q 1/302; B60Q 1/46; B60Q 2400/20
See application file for complete search history.

(56) References Cited

U.S. PATENT DOCUMENTS

| | | |
|---|---|---|
| 8,487,752 B2 | 7/2013 | Stillfried et al. |
| 9,132,740 B2 | 9/2015 | Grider et al. |

(Continued)

FOREIGN PATENT DOCUMENTS

| | | |
|---|---|---|
| DE | 102011115161 | 3/2013 |
| DE | 102014222695 | 10/2015 |
| DE | 102014016334 | 5/2016 |

*Primary Examiner* — Nader Bolourchi
(74) *Attorney, Agent, or Firm* — Carlson, Gaskey & Olds, P.C.

(57) ABSTRACT

An exemplary vehicle lighting system includes a braking indicator having a lens with a first region colored differently than a second region, and a control system configured to control a first light source to emit light through the first region to indicate a first operating behavior of a vehicle, and a second light source to emit light through the second region to indicate a second operating behavior of the vehicle. An exemplary indicating method for a vehicle includes producing a first lighting effect through a first region of a lens to indicate a first operating behavior of a vehicle. The first operating behavior is a braking of the vehicle. The indicating method further includes producing a second lighting effect through a second region of the lens to indicate a different, second operating behavior of the vehicle. The first region colored differently than the second region.

20 Claims, 4 Drawing Sheets

(51) Int. Cl.
*F21Y 115/10* (2016.01)
*F21Y 113/13* (2016.01)

(56) References Cited

U.S. PATENT DOCUMENTS

| | | | |
|---|---|---|---|
| 2004/0227627 A1* | 11/2004 | Li | B60Q 1/302 |
| | | | 340/464 |
| 2012/0133282 A1 | 5/2012 | Rubio et al. | |
| 2014/0300463 A1* | 10/2014 | Russ | B60Q 1/46 |
| | | | 340/471 |
| 2014/0301101 A1 | 10/2014 | Russ | |
| 2015/0170513 A1* | 6/2015 | Gipaya | G08G 1/005 |
| | | | 340/944 |

* cited by examiner

LIGHTING SYSTEM AND INDICATING METHOD FOR A VEHICLE

TECHNICAL FIELD

This disclosure relates generally to vehicle lighting. More particularly, the disclosure relates to a braking indicator, such as a Center High-Mount Stop Lamp (CHMSL), that can emit light through differently colored regions of a lens to indicate various operating behaviors of a vehicle.

BACKGROUND

Vehicle lighting systems include a multitude of lighting and signaling devices for illuminating the vehicle and alerting others of the vehicle's presence and the driving intentions. Vehicles typically include a Center High-Mount Stop Lamp (CHMSL) as a lighting and signaling device that illuminates to indicate a braking of the vehicle.

Some electrified vehicles include a traction battery that can be charged from a source external to the electrified vehicle, such as a grid power source. Some electrified vehicles include charge indicators surrounding charge ports of the electrified vehicle. These charge indicators can visually indicate the progress of a charge, but viewing these charge indicators can be difficult. Vehicles use other types of indicators, such as indicators revealing whether a door is locked or unlocked.

SUMMARY

A vehicle lighting system according to an exemplary aspect of the present disclosure includes, among other things, a braking indicator having a lens with a first region colored differently than a second region. The system further includes a control system configured to control at least one first light source to emit light through the first region to indicate a first operating behavior of a vehicle, and at least one second light source to emit light through the second region to indicate at least one second operating behavior of the vehicle.

In a further non-limiting embodiment of the foregoing system, the at least one first and second light sources each comprise a light emitting diode (LED).

In a further non-limiting embodiment of any of the foregoing systems, the at least one second light source comprises a multicolored LED.

In a further non-limiting embodiment of any of the foregoing systems, the at least one second light source comprises a Red, Green, Blue (RGB) LED.

In a further non-limiting embodiment of any of the foregoing systems, the first and second regions are different regions of a single unitary structure. The first region extends across the at least one first light source. The second region extends across the at least one second light source.

In a further non-limiting embodiment of any of the foregoing systems, the first region and the second region are arranged as alternating strips across the lens.

In a further non-limiting embodiment of any of the foregoing systems, the first region has a redder hue than the second region.

In a further non-limiting embodiment of any of the foregoing systems, the braking indicator is a Center High-Mount Stop Lamp (CHMSL).

In a further non-limiting embodiment of any of the foregoing systems, the at least one second operating behavior is a charge status of the vehicle.

In a further non-limiting embodiment of any of the foregoing systems, the at least one light source comprises at least one multi-colored LED. The controller is configured to control the at least one multi-colored LED to illuminate in a color that represents a remaining time required to charge a traction battery of the vehicle from a grid power source.

In a further non-limiting embodiment of any of the foregoing systems, the at least one second operating behavior indicates whether the vehicle is locked or unlocked.

In a further non-limiting embodiment of any of the foregoing systems, the at least one second operating behavior illuminates an area near the vehicle.

In a further non-limiting embodiment of any of the foregoing systems, the at least one second operating behavior identifies the vehicle by a flashing of the at least one second light source, a color of the at least one second light source, or both.

In a further non-limiting embodiment of any of the foregoing systems, the first operating behavior is a braking of the vehicle.

An indicating method for a vehicle according to an exemplary aspect of the present disclosure includes, among other things, producing a first lighting effect through a first region of a lens to indicate a first operating behavior of a vehicle. The first operating behavior is a braking of the vehicle. The method further includes producing a second lighting effect through a second region of the lens to indicate a different, second operating behavior of the vehicle. The first region is colored differently than the second region.

In a further non-limiting embodiment of the foregoing method, the second lighting effect indicates a charge status of the vehicle.

In a further non-limiting embodiment of any of the foregoing methods, the second lighting effect indicates whether the vehicle is locked or unlocked.

In a further non-limiting embodiment of any of the foregoing methods, the second lighting effect illuminates an area near the vehicle.

In a further non-limiting embodiment of any of the foregoing methods, the first region has a redder hue than the second region.

In a further non-limiting embodiment of any of the foregoing methods, the method includes changing a color of light from at least one multi-colored light emitting diode (LED) to produce the second lighting effect.

BRIEF DESCRIPTION OF THE FIGURES

The various features and advantages of the disclosed examples will become apparent to those skilled in the art from the detailed description. The figures that accompany the detailed description can be briefly described as follows:

FIG. 5B illustrates the region of the lens of FIG. 5A emitting light in a second color.

FIG. 5C illustrates the region of the lens of FIG. 5A emitting light in a third color.

FIG. 5D illustrates the region of the lens of FIG. 5A emitting light of a first color through a first area of the region and emitting light of a second color through a second area of the region.

FIG. 5E illustrates the region of the lens of FIG. 5A emitting light of a first color through a first area of the region greater than the first area of FIG. 5D, and emitting light of a second color through a second area of the region less than the second area of FIG. 5D.

DETAILED DESCRIPTION

Generally, the disclosure relates to vehicle lighting systems that indicate more than one operating behavior of a vehicle. One of the operating behaviors can include a braking of the vehicle. Separate lighting structures are thus not required to indicate both a braking of the vehicle and the other operating behavior.

Figure 1:
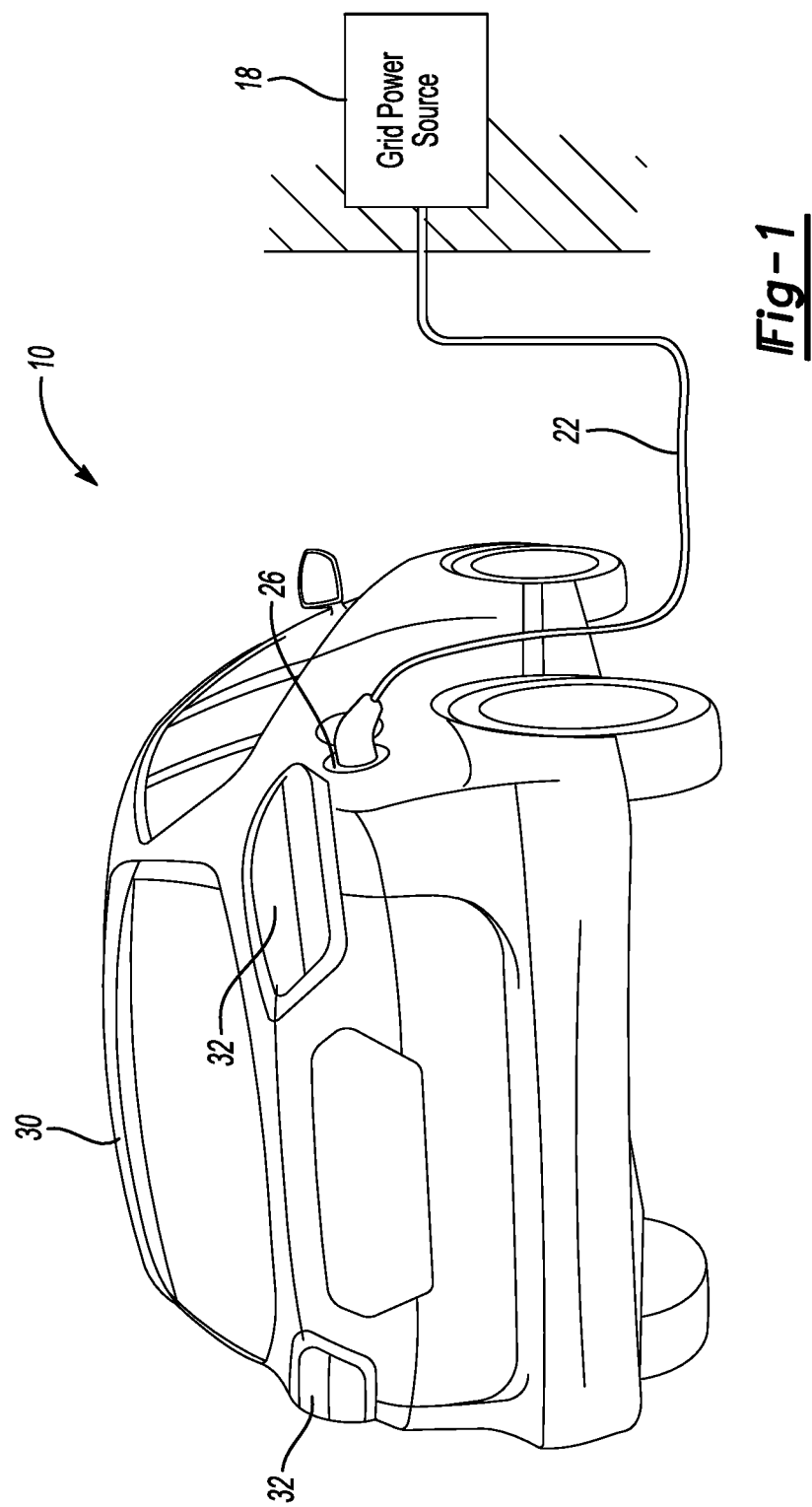
FIG. 1 illustrates an electrified vehicle that is charging at a schematically represented charge station.

Referring to FIG. 1, an exemplary electrified vehicle 10 includes a traction battery 14 that can charge using grid power from a grid power source 18 external to the vehicle 10. A charger 22 couples the electrified vehicle 10 to the grid power source 18 through a charge port 26 during a charge. Charging the traction battery 14 from the grid power source 18 can take time.

The vehicle 10 includes a Center High-Mount Stop Lamp (CHMSL) 30 that produces a lighting effect to indicate various operating behaviors of the vehicle 10. In an exemplary non-limiting embodiment, one of the operating behaviors is a braking of the electrified vehicle 10 during a drive cycle. The CHMSL 30 is considered a braking indicator as the CHMSL 30 can emit light to indicate that the vehicle 10 is braking. The vehicle 10 additionally includes rear brake lights 32, which are another type of braking indicator.

In this exemplary embodiment, the CHMSL 30 additionally produces a lighting effect to indicate a charge progress of the vehicle 10. This lighting effect can reveal, for example, a general estimate of the amount of time remaining to complete a charge of the traction battery 14 from the grid power source 18.

Utilizing the CHMSL 30 to indicate a braking of the vehicle 10, and additionally to indicate another operating behavior of the vehicle 10, can reduce complexity of the vehicle 10 since no charge indicator separate from the CHMSL 30 is required.

Figure 2:
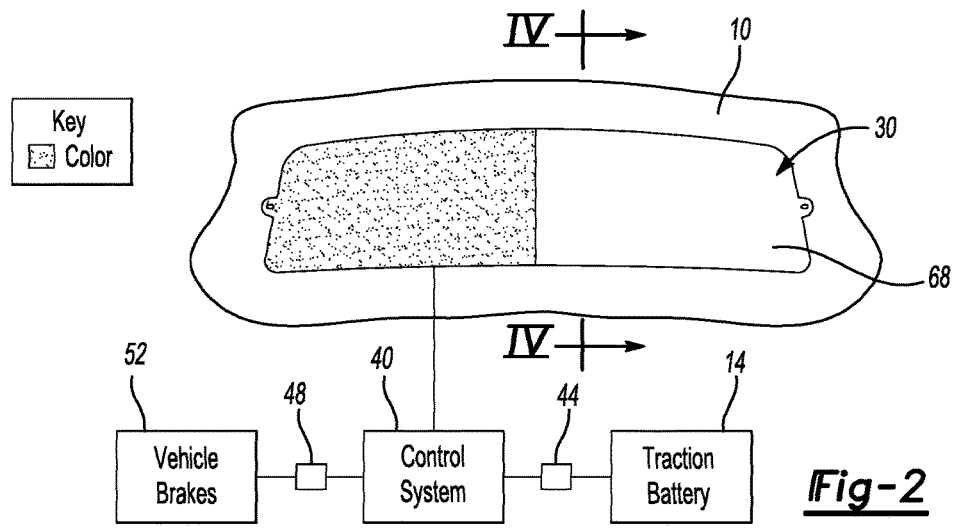
FIG. 2 illustrates a close-up, and partially schematic, view of a vehicle lighting system from the electrified vehicle of FIG. 1 that includes a Center High-Mount Stop Lamp (CHMSL).
Figure 3:
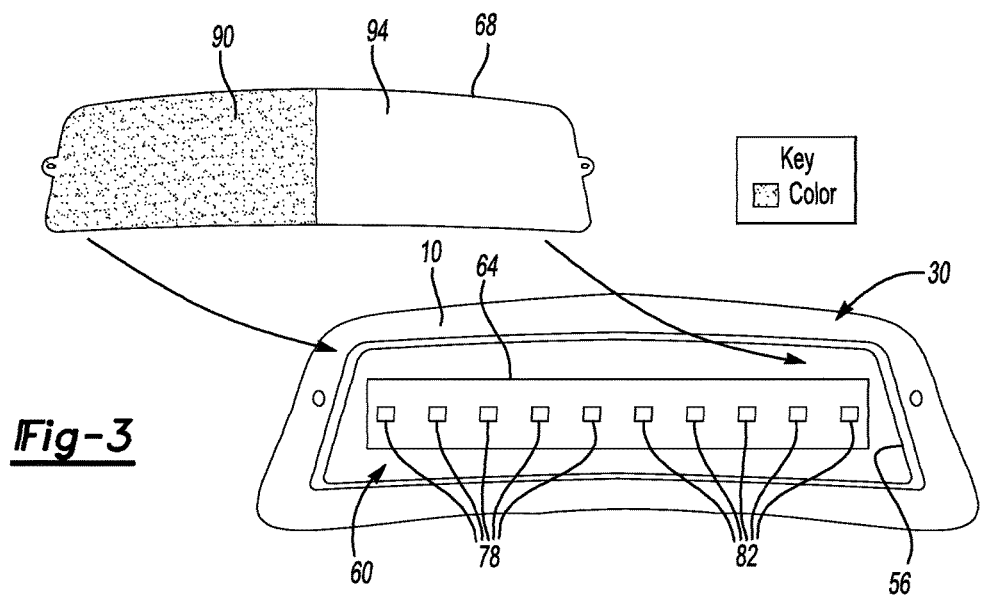
FIG. 3 illustrates an expanded view of the CHMSL of FIG. 2 with a lens removed to reveal first and second light sources of the CHMSL.
Figure 4:
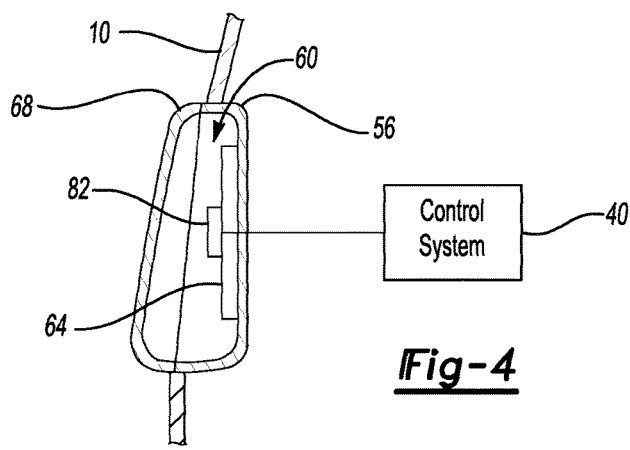
FIG. 4 illustrates a section view taken along line IV-IV in FIG. 2.

Referring now to FIGS. 2-4 with continuing reference to FIG. 1, the vehicle 10 includes a control system 40 operably coupled to the CHMSL 30, a traction battery charge sensor 44, a vehicle braking sensor 48, and vehicle brakes 52. The control system 40 gathers information from the traction battery charge sensor 44 and the vehicle braking sensor 48 and, in response, controls the CHMSL 30 to emit corresponding lighting effects.

Generally, the CHMSL 30 includes a housing 56 providing a cavity 60. A lighting assembly 64 fits within the cavity 60 and is covered by a lens 68. The lighting assembly 64 includes a plurality of first light sources 78 and a plurality of second light sources 82. In this example, the first light sources 78 and the second light sources 82 are light emitting diodes. In an exemplary non-limiting embodiment, the first light sources 78 are single colored LEDs, and the second light sources 82 are multicolored LEDs, such as Red, Green, Blue (RGB) LEDs.

The lens 68 includes a first region 90 and a second region 94 molded together as a single unitary structure. The first region 90 covers the first light sources 78, and the second region 94 covers the second light sources 82 when the lens 68 is in the installed position of FIG. 2.

The first region 90 is colored differently than the second region 94. In this example, the first region 90 has a redder hue than the second region 94. The first region 90, for example, can be red while the second region 94 is clear.

Because the first region 90 is red, the first light sources 78 can be incandescent bulbs, which may be less expensive than LEDs. When the first light sources 78 emit light, the first region 90 filters all the light except the red light. The light from the CHMSL 30 is then perceived as red.

During a drive cycle of the vehicle 10, when the control system 40 receives an input from the vehicle braking sensor 48 indicating that the electrified vehicle 10 is braking, the control system 40 turns on the plurality of first light sources 78 to produce a first lighting effect through the first region 90 of the lens. Because the first region 90 has, in this example, a reddish hue, the perceived light from the CHMSL 30 when the first light sources 78 are illuminated is red.

When the control system 40 detects that the electrified vehicle 10 is charging from the grid power source 18, the control system 40 can produce a second lighting effect by turning on the second light sources 82 to emit light through the second region 94 of the lens 68. Since, in this example, the second lighting sources 82 are RGB LEDs, the control system 40 can alter a color of the light emitted from the second lighting sources 82 to provide a distinct visual indication of a particular operating behavior of the electrified vehicle 10, here a status of the charge. The second region 94 is relatively clear so that the color of the second light sources 82 when activated can be viewed without being substantially altered by a colored lens.

The first light sources 78 are controllably separately from the second light sources 82. In some examples, the first light sources 78 may be on a separate circuit from the second light sources 82. Isolating the first light sources 78 from the second light sources 82 can ensure that the first light sources 78 can emit light to indicate that the vehicle 10 is braking, even if the second light sources 82 have failed.

Regulatory requirements may require such separation between the first light sources 78 and the second light sources 82. Further, regulatory requirements may require a particular color, here red, when the electrified vehicle 10 is braking. The differently colored regions of the lens 68 permit meeting the regulatory requirements while still providing an area to view light emanating from the multicolored LEDs of the CHMSL 30.

Figure 5A:
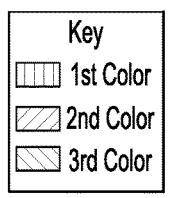
FIG. 5A illustrates a region of the lens of FIG. 3 emitting light in a first color.
Figure 5A:
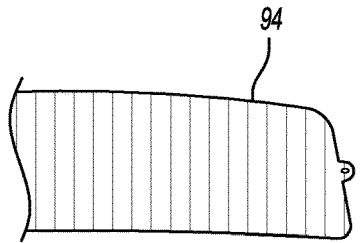

Referring now to FIGS. 5A-5E with continuing reference to FIGS. 1 to 4, the color from the second region 94 of the lens 68 could be a single color as shown in FIG. 5A, such as a red color. The red color can, for example, indicate substantial time remaining to charge the traction battery 14 of the electrified vehicle 10, say more than sixty minutes.

The red color could be flashed on and off to indicate a charging issue, such as grid power source 18 failing to convey power to the vehicle 10, or the charger 22 being disengaged.

The red color emanating through the second region 94 could also be used to indicate braking of the electrified vehicle 10 by changing the second light sources 82 to emanate a red light through the second region 94 in response to a command from the control system 40. When utilized to indicate braking, the second light sources 82 can combine with the red light emanating through the first region 90 of the lens 68 from the first light sources 78.

In the event that the second light sources 82 fail to provide a red color, the regulatory requirement to provide a red color from the CHMSL 30 is still met via the first light sources 78 emitting light through the first region 90.

Referring to FIG. 5B, the color emanating from the second region 94 can change to a second color different than the first color of FIG. 5A. The second color of FIG. 5B could be yellow and could, for example, indicate that there is less time to complete a charge of the electrified vehicle 10 than if the light emanating from the second region 94 is red. Yellow could indicate thirty minutes remaining in a charge, for example.

In some examples, the second light sources 82 gradually transitions from the color of FIG. 5A to the color of FIG. 5B. The gradual transition represents gradual decrease in time from sixty minutest to thirty minutes. An observer would be able to discern from a light that is there is more time remaining in the charge if the light is redder. As the time remaining in the charge decreases, the light gradually becomes yellower. Red, green, and blue colors from RGB LEDs, for example, can be mixed to provide a variety of colors.

Referring to FIG. 5C, the color emanating from the second region 94 could be a third color different than both the second color of FIG. 5B and the first color of FIG. 5A. The third color could be, for example, a green, which indicates that a charge of the traction battery 14 is complete or that there is less than five minutes remaining until completion. The color emanating from the second region can gradually transition from yellow to green as the time to complete the charge decreases. The greener the light, the less time remaining to complete the charge.

Charge status can be shown in other ways, for example, with reference to FIG. 5D, a charge progress can be visually indicated through the second region 94 by controlling some of the second light sources 82 to emit the third color, here green, and others of the second light sources 82 to emit the first color, here red. As shown in FIG. 5D, approximately a quarter of the second region 94 is green and approximately 75% of the second region 94 is red. This provides a visual indication that about 25% of a charge procedure has been completed.

Moving to FIG. 5E, approximately 75% of the second region 94 is a green color, and the remaining 25% of the second region 94 is a red color. This provides a visual indication that approximately 75% of the charge procedure has been completed.

The second operating behavior of the electrified vehicle 10 has been described in connection with a charging status, however various operating behaviors could be indicated. That is, although shown and described in connection with a charge time remaining, other operating behaviors can be indicated and would fall within the scope of this disclosure.

Another example operating behavior can include an indication to an operator outside the electrified vehicle 10 that the doors of the electrified vehicle 10 are locked or unlocked. The operator may recognize, for example, a green light through the second region 94 indicating that the doors are locked, and a red light emanating through the second region 94 indicating that the doors are unlocked.

Still, other operating behaviors could include simply illuminating an area of the vehicle 10 as a welcome or farewell light or to assist in locating the vehicle 10. For example, when an operator is attempting to locate the electrified vehicle 10 within a dark parking garage, the control system 40 may emit a high intensity white light through the second region 94 to reveal a location of the electrified vehicle 10 within the parking garage. The control system 40 could control the second light sources 82 to flash to provide further visual queuing. The coloring, flashing, intensity, etc. can be customized by an operator of the vehicle 10 via a human machine interface, such as a touch screen within the vehicle 10.

In some examples, a coloring, flashing, or intensity of the second light sources 82 can help to identify the vehicle 10. If the vehicle 10 is an autonomous vehicle, the second light sources 10 can flash a specific color code to identify the vehicle 10 for a rider being picked up.

Although the control system 40 has been described in connection with these second operating behaviors indicated through the second region 94, the first light sources 78 could additionally be used together with the second light sources 82.

Figure 6:
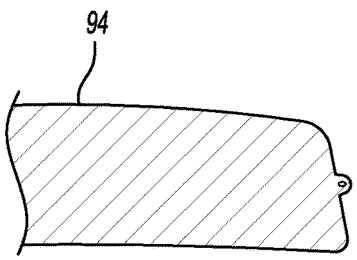
FIG. 6 illustrates steps in an example indicating method for the vehicle of FIG. 1.
Figure 6:
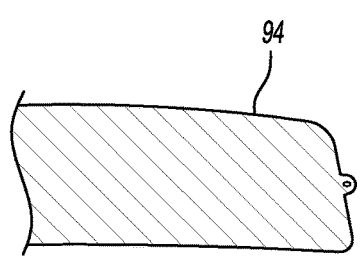
Figure 6:
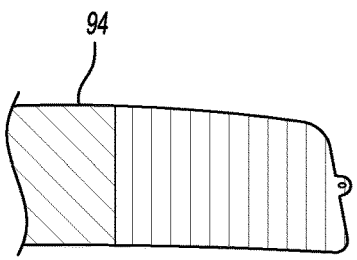
Figure 6:
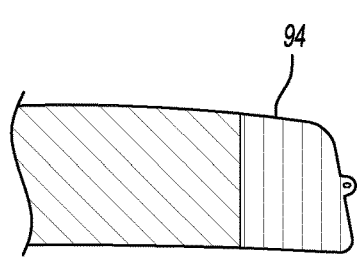
Figure 6:
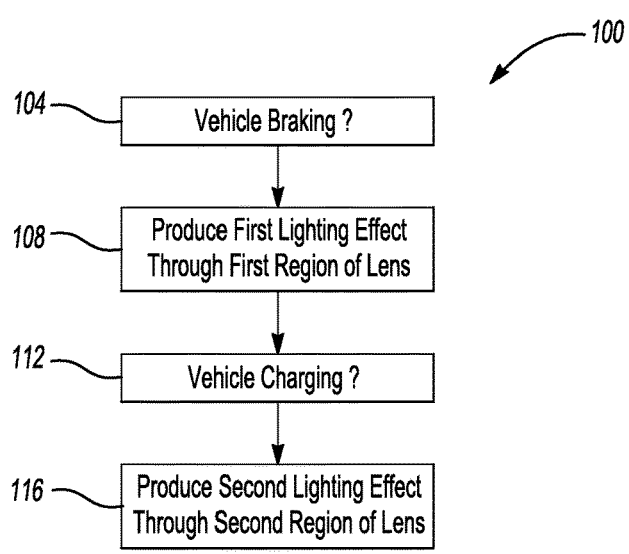

Referring to FIG. 6, an exemplary indicating method utilized in connection with the vehicle 10 of FIGS. 1-5 includes a step 104 of determining whether the electrified vehicle 10 is braking. If the electrified vehicle 10 is braking, the method moves to a step 108 where the control module causes the first light sources 78 to emanate light through at least the first region 90 of the lens 68 at a step 108. In a step 112 of the method 100, the electrified vehicle is assessed to determine whether or not the electrified vehicle 10 is charging. If the electrified vehicle 10 is charging, the method 100 moves to a step 116 where the control system 40 produces a second lighting effect through at least the second region of the lens 68.

The intensity of the lighting effect could be influenced, in some examples, by a time of day, or a day/night sensors. The intensity can be increased in low light conditions, for example.

Figure 7:
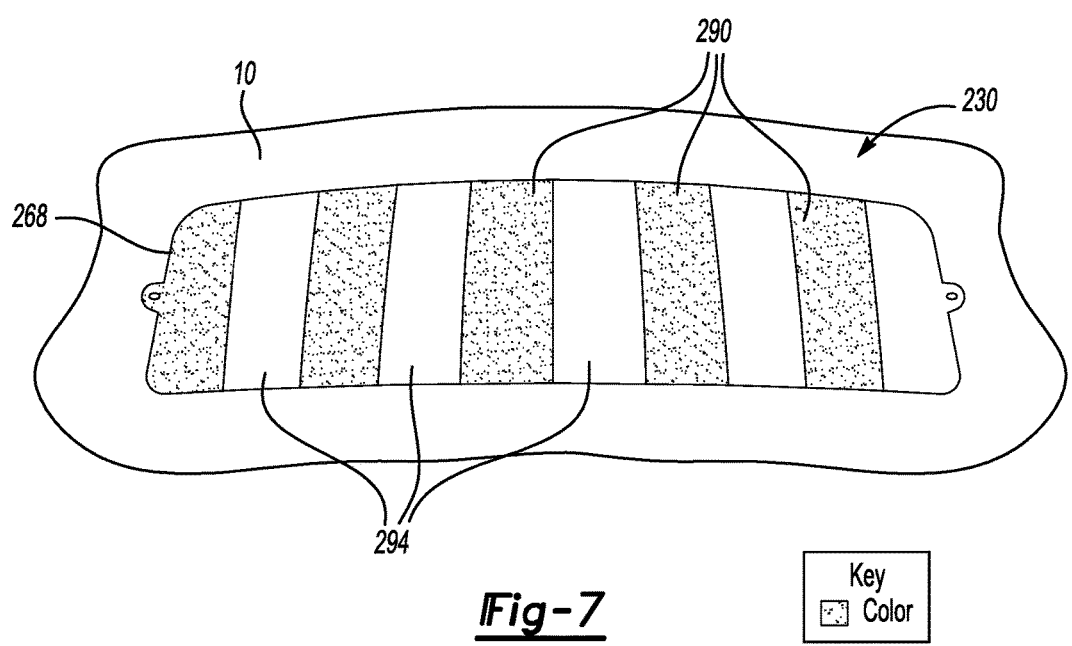
FIG. 7 illustrates a close-up view of a lighting system for use in the vehicle of FIG. 1 according to another exemplary non-limiting embodiment.

Referring now to FIG. 7, another exemplary CHMSL 230 can be used in connection with the vehicle 10. The CHMSL 230 includes a lens 268 having a first region 290 and a second region 294 as a plurality of alternating strips arranged along a length of the lens 268. The strips extend vertically in this example.

The five strips of the first region 290 could cover respective first light sources, and the five strips of the second region 294 could cover respective second light sources. That is, the first and second light sources within the CHMSL 230 could alternate so that the first region 290 and the second region 294 cover the appropriate lighting device.

Features of the disclosed examples include a vehicle lighting system that can indicate a variety of operating behaviors from a common device while meeting potential regulatory requirements to keep the functionality of the operating behaviors separate from each other.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:
1. A vehicle lighting system, comprising:
   a braking indicator having a lens with a first region colored differently than a second region; and a control system configured to control at least one first light source to emit light through the first region to indicate a first operating behavior of a vehicle, and at least one second light source to emit light through the second region to indicate at least one second operating behavior of the vehicle.

2. The vehicle lighting system of claim 1, wherein the at least one first and second light sources each comprise a light emitting diode (LED).

3. The vehicle lighting system of claim 1, wherein the at least one second light source comprises a multicolored LED.

4. The vehicle lighting system of claim 1, wherein the at least one second light source comprises a Red, Green, Blue (RGB) LED.

5. The vehicle lighting system of claim 1, wherein the first and second regions are different regions of a single unitary structure, the first region extending across the at least one first light source, the second region extending across the at least one second light source.

6. The vehicle lighting system of claim 1, wherein the first region and the second region are arranged as alternating strips across the lens.

7. The vehicle lighting system of claim 1, wherein the first region has a redder hue than the second region.

8. The vehicle lighting system of claim 1, wherein the braking indicator is a Center High-Mount Stop Lamp (CHMSL).

9. The vehicle lighting system of claim 1, wherein the at least one second operating behavior is a charge status of the vehicle.

10. The vehicle lighting system of claim 9, wherein the at least one light source comprises at least one multi-colored LED, the controller configured to control the at least one multi-colored LED to illuminate in a color that represents a remaining time required to charge a traction battery of the vehicle from a grid power source.

11. The vehicle lighting system of claim 1, wherein the at least one second operating behavior indicates whether the vehicle is locked or unlocked.

12. The vehicle lighting system of claim 1, wherein the at least one second operating behavior illuminates an area near the vehicle.

13. The vehicle lighting system of claim 1, wherein the at least one second operating behavior identifies the vehicle by a flashing of the at least one second light source, a color of the at least one second light source, or both.

14. The vehicle lighting system of claim 1, wherein the first operating behavior is a braking of the vehicle.

15. An indicating method for a vehicle, comprising:
producing a first lighting effect through a first region of a lens to indicate a first operating behavior of a vehicle, the first operating behavior a braking of the vehicle; and
producing a second lighting effect through a second region of the lens to indicate a different, second operating behavior of the vehicle, the first region colored differently than the second region.

16. The indicating method of claim 15, wherein the second lighting effect indicates a charge status of the vehicle.

17. The indicating method of claim 15, wherein the second lighting effect indicates whether the vehicle is locked or unlocked.

18. The indicating method of claim 15, wherein the second lighting effect illuminates an area near the vehicle.

19. The indicating method of claim 15, wherein the first region has a redder hue than the second region.

20. The indicating method of claim 15, further comprising changing a color of light from at least one multi-colored light emitting diode (LED) to produce the second lighting effect.

* * * * *

UNITED STATES PATENT AND TRADEMARK OFFICE
CERTIFICATE OF CORRECTION

PATENT NO. : 10,029,610 B1
APPLICATION NO. : 15/604014
DATED : July 24, 2018
INVENTOR(S) : Stuart C. Salter et al.

Page 1 of 1

It is certified that error appears in the above-identified patent and that said Letters Patent is hereby corrected as shown below:

In the Claims

In Claim 10, Column 7, Line 32; before "comprises at least" replace "least one light source" with --least one second light source--

Signed and Sealed this
Fourth Day of September, 2018

Andrei Iancu
*Director of the United States Patent and Trademark Office*